Jan. 30, 1968     C. W. MacMILLAN     3,365,940
VEHICLE TESTING UNIT
Filed July 20, 1965     2 Sheets-Sheet 1
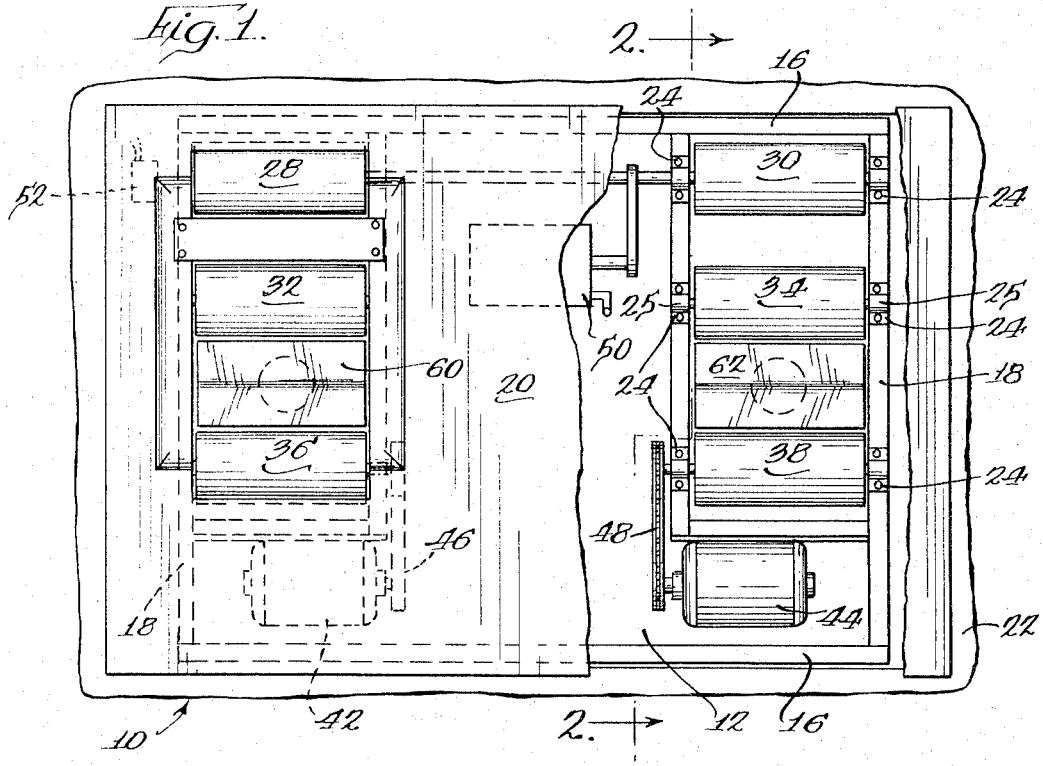
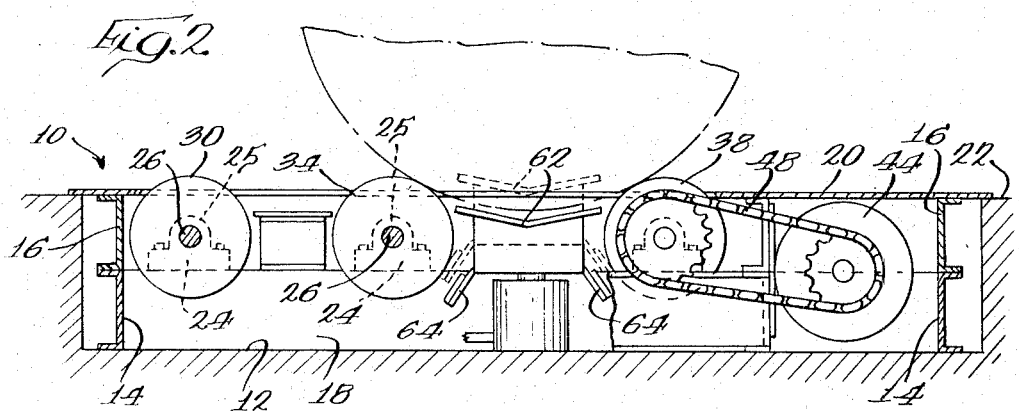
Inventor:
Charles W. MacMillan
By
Gary, Parker, Juettner & Cullinan
Attys Jan. 30, 1968   C. W. MacMILLAN   3,365,940
VEHICLE TESTING UNIT Filed July 20, 1965                    2 Sheets-Sheet 2

Inventor:
Charles W. MacMillan
By
Gary, Parker, Juettner & Cullinan
Att'ys

United States Patent Office 3,365,940
Patented Jan. 30, 1968

3,365,940
VEHICLE TESTING UNIT
Charles W. MacMillan, Rock Island, Ill., assignor to Bear Manufacturing Company, Rock Island, Ill., a corporation of Delaware
Filed July 20, 1965, Ser. No. 473,305
4 Claims. (Cl. 73—117)

ABSTRACT OF THE DISCLOSURE

Automotive vehicle testing apparatus comprising three pairs of wheel-supporting rolls, a forwardly disposed pair for use in power testing, a rearwardly disposed pair for use in brake testing and an intermediate pair of idler rolls; means associated with the forward rolls for absorbing the vehicle drive force applied thereto and for measuring the force so absorbed; a drive motor for each of said rearward rolls, current supply lines for each motor, inductor coils on the current supply lines, electric circuit means for adding the currents induced in the coils associated with the two motors and for subtracting one induced current from the other, and meters connected in said circuit means for indicating the added current as a total pounds braking force and for indicating the resultant of the subtracted currents as the degree of brake balance or imbalance.

---

The present invention relates to vehicle testing devices and more particularly to devices for testing the brakes of automobiles, trucks and the like and the electrical circuitry associated therewith.

One of the objects of this invention is to provide a means for measuring the braking force on the wheels of a vehicle.

A further object is to provide means whereby the total braking force on a pair of vehicle wheels may be measured. Another object is to provide means whereby the braking forces on a pair of vehicle wheels may be compared to determine whether any braking force unbalance exists between the pair of wheels being tested.

A still further object is to provide in a brake testing device the necessary electrical circuitry for measuring the total braking force on a pair of vehicle wheels and also for comparing the braking forces on a pair of vehicle wheels to determine the brake force unbalance.

Another object is to provide a combination device which includes in one unit a road condition simulator and a brake testing mechanism to achieve the above stated objects.

Other objects and advantages of the invention will become apparent in the following detailed description.

In accordance with the above stated objects I have provided a combination unit which may be used in part as a road condition simulator and in part as a brake testing mechanism for the wheels of an automotive vehicle.

The apparatus comprises essentially six rolls arranged in pairs. The middle pair of rolls are idler rolls and are used both as part of the road condition simulator and as part of the brake testing mechanism.

In the brake testing mechanism a pair of automobile wheels, the brakes of which are to be tested, are supported on four of the rolls. Two of the rolls are driven by motors powered from a standard electrical source.

When the front wheels, for example, are being driven by the motors to test their brakes, the operator energizes the brakes with the foot pedal. The resistance introduced to the turning wheels is then transmitted to the motor driven rolls. The effort required to continue the rolls in rotation against the braking action of the wheels requires more current to be delivered to the motors due to the higher load thereon.

The increase in the ampere load received by the motors when braking is applied is measured and translated into an indication of the actual braking force action on the wheels.

This total braking force is measured through a network of electrical circuitry and is indicated at a meter in the electrical circuit.

In addition to determining the total braking force this device is also effective to make a comparison of the braking forces on each of the two wheels being tested in order to determine the braking unbalance that may exist between the two wheels. A meter is provided to indicate the degree of unbalance that exists.

When the road condition simulator portion of the device is to be used, another pair of rolls, not used in the brake testing operation, is used together with the idler rolls mentioned above as being common to the two units.

Now, in order to acquaint those skilled in the art with the manner of making and using my improved apparatus, I shall describe, in connection with the accompanying drawings, a preferred embodiment of the apparatus of the invention, and a preferred manner of making and using the same.

In the drawings:

FIGURE 1 is a plan view of a preferred embodiment of the invention, a portion of the cover plate being broken away to reveal the wheel supporting rolls;

FIGURE 2 is a longitudinal section taken at line 2—2 of FIGURE 1;

Figure 3:
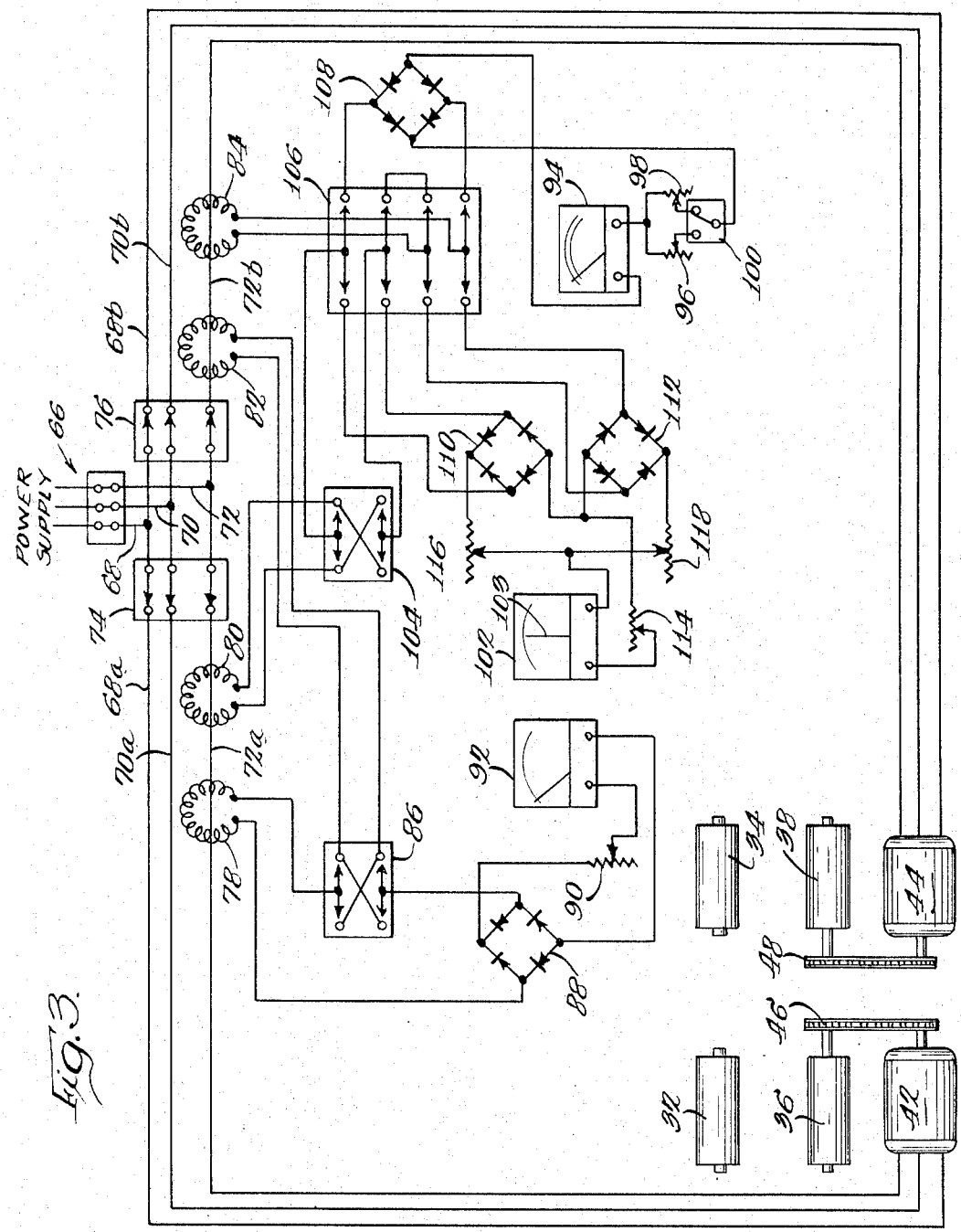
FIGURE 3 is a schematic electrical circuit diagram of the testing apparatus.

Referring now to the drawings 10 indicates generally a vehicle testing device. This testing device is disposed in a pit 12 of a garage or shop area. A frame structure supports the device 10 and comprises lower and upper channel irons 14 and 16 disposed substantially at the ends of the pit. These channel irons are joined by other rigid members, such as channel sectioned members 18, disposed transversely to the channel irons at the sides of the pit to form part of the frame on which the device is supported. A cover plate 20 positioned substantially flush with the floor 22 is supported on the channel members 16 and whatever intermediate support may be necessary.

A plurality of pillow blocks 24 are mounted on the channel sectioned members 18 at the side of the pit 12 and inwardly of such edge as shown in FIGURE 1. Each of these pillow blocks 24 carries a bearing 25. Shaft members 26 are journalled in these bearings and each carry a roll rigidly secured thereto.

These rolls are arranged in pairs axially spaced from each other. The first pair includes rolls 28 and 30; the second pair includes rolls 32 and 34; and the third pair includes rolls 36 and 38. The first pair 28 and 30 are vehicle driven rolls and are coupled together for joint rotation or may be supported on a common shaft 40 as shown. The second pair 32 and 34 are mounted for independent rotation and are idler rolls. The third pair 36 and 38 are mounted for independent rotation and are individually driven by motors 42 and 44 respectively suitably through individual pulley arrangements 46 and 48. In the preferred form the rolls are all of the same diameter.

The motor 42 and 44 are positioned in pit 12 and supported therein by suitable means, as by being mounted on the supporting structure for rolls 36 and 38. As noted from FIGURE 2, the motors are mounted under the cover plate 20. In a preferred form the motors are of a 20 H.P. rating.

The first and second pair of rolls are used in conjunction with the road condition simulator portion of this device which is adapted to function in the manner described in my U.S. Patent 2,923,149 issued February 2, 1960. A load absorption unit 50 as schematically illustrated is connected to the drive rolls 28 and 30. This absorption unit 50 may be of a well known hydraulic type. It has connected thereto appropriate means for measuring the power delivered at the wheels of a vehicle driving the drive rolls 28 and 30.

The second and third pair of rolls are used in conjunction with the brake-testing function of the device. Thus it will be noted that the pair of idler rolls 32 and 34 are common to the road condition simulator and the brake-testing device.

It has been determined with respect to the first and second pair of rolls (the road condition simulator) that a spacing of 14–16 inches between the roll centers is particularly appropriate. This relatively short spacing reduces tire wear during the long period that the wheels of the vehicle must rest on these rolls for engine analysis.

On the other hand a spacing between roll center of the second and third pair of rolls (the brake testing device) of about 19½ inches has been found appropriate. The tests made on theses rolls are of a much shorter duration and hence, tire wear is not as great a consideration. Furthermore, greater spacing gives added safety. Greater spacing also allows more weight to be put on the rolls, and thus a more accurate brake test is obtainable.

One of the drive rolls 28 or 30 may also have operatively associated therewith an odometer and speedometer test generator unit 52 which may be driven, for example, from the shaft of the roll 28. Such unit may be of the type described in my U.S. Patent 3,178,927 issued April 20, 1965.

The device 10 further comprises air-operated jack platform 60 and 62 positioned between rolls 32 and 36 and between rolls 34 and 38. The platforms respectively are adapted to supportingly receive a vehicle wheel and to raise the vehicle wheels from their position between the second and third pair of rolls when the vehicle being tested is ready to move from that position.

Brake means 64 are associated with each of said jack platforms to prevent the rolls 32, 34, 36 and 38 from turning once the platforms have been raised in preparation for moving a vehicle off the rolls. It will be noted from FIGURE 2 that brake means 64 are adapted to engage rolls 32, 36, and 34, 38 when the platform 62 is raised upward to the dotted line position.

FIGURE 3 shows the electrical circuitry associated with the brake testing portion of the device.

The rolls 36 and 38 are independently driven by the motors 42 and 44 respectively through a chain and sprocket or belt drive. The power to drive the motors is obtained from a standard electrical source such, for example, as a single or three phase 220 volts, 208 volts or 440 volts A.C. source.

For purposes of describing the invention there is shown in FIGURE 3 a 3-phase power supply 66. Leads 68, 70, and 72 of the power supply can be connected to supply lines 68a, 70a and 72a through switch 74 to supply power to the motor 42. The power supply can also be connected to supply lines 68b, 70b and 72b through switch 76 to supply power to the motor 44.

Induction coils (also referred to as inductor coils or current coils) 78 and 80 are associated with supply line 72a to motor 42. Induction coils 82 and 84 are associated with supply line 72b to motor 44. Preferably these induction coils 78, 80, 82 and 84 are of the toroidal type thus permitting a compact design, a high relative output and convenient extension of the power supply wires therethrough.

In each case the supply lines 72a and 72b pass through the induction coils. The lines of force set up by the current passing through the supply lines 72a and 72b will cut the coils of the inductors at right angles, whereby a current is generated in each coil which is proportional to the current drawn by the motors.

Inductors 78 and 82 for supplying current to the computing means are connected in series with each other through a phase reversing switch 86, a full wave rectifier 88 and a variable resistor 90 to a braking force meter 92. The purpose of the phase reversing switch 86 is to permit reversing the leads of inductor 82 with respect to inductor 78 thereby making it possible to obtain correct phasing of inductors 78 and 82 regardless of whether they have been strung on the main supply lines 72a and 72b identically or not. In order to insure that inductors 78 and 82 are properly phased, all that is necessary is to observe the meter 92 during calibration and throw switch 86 to the one of two positions at which the higher reading is obtained. Switch 86 then remains in that position. Variable resistor 90 is used as a calibrating device to set the meter 92 to a desired or predetermined calibrated position when a predetermined load is applied to the motors.

The braking force meter 92 is calibrated to read in pounds of pull at the tire tread and records the sum or arithmetic total of the braking force of the two vehicle wheels being tested.

Induction coils 80 and 84 are strung on supply lines 72a and 72b to serve as a source of current for two different functions. The coils are connected, through a phase reversing switch 104 for coil 80 which performs the same type of function as switch 86, to a double throw four pole switch 106 which serves as a function selector switch. In one position, switch 106 diverts the output of coils 80 and 84 to the circuit of an ammeter 94 through a full wave rectifier 108. When thrown in the other direction, the switch connects the coils 80 and 84 to a brake balance meter 102 through a network including rectifiers 110 and 112 and variable resistor 114, 116 and 118.

The ammeter 94, which is preferably a dual range meter, is initially calibrated by temporarily connecting a standard ammeter in the supply circuit to the motors, loading the motors to some definite point on the standard ammeter, as by the brakes of a vehicle supported on rolls 32–34 and 36–38, and then adjusting the resistance of the circuit of ammeter 94 to obtain the same or an appropriately correlated reading. With a dual range meter 94, a selector switch 100 is provided to select the meter range (i.e., high or low) and a calibrating resistor 96 and 98 is connected in series with each output pole of the switch to facilitate high and low range calibration of the meter.

Once calibration of the ammeter 94 has been accomplished, the braking force meter 92 may be calibrated by braking the rolls 36 and 38, by applying the vehicle brakes, until a predetermined point on ammeter 94 is indicated. Then variable resistor 90 may be adjusted until the meter 92 indicates the amount of braking force which corresponds to the calibration point on ammeter 94.

When meter 92 has been calibrated, switch 106 may be thrown to connect the induction coils 80 and 84 to rectifiers 110 and 112 to provide direct current to the brake balance meter 102. Inductor coil 80 is connected to series with rectifier unit 110 and variable resistor 116 through switches 104 and 106; and inductor coil 84 is connected in series with rectifier unit 112 and variable resistor 118 through switch 106. The DC current flowing from each of the rectifiers represents the current draw into each of the motors 42 and 44 and is proportional to the braking force on the respective rolls 36 and 38 associated therewith.

The currents from rectifiers 110 and 112 are brought into opposition through variable resistors 116 and 118. When resistors 116 and 118 are adjusted to obtain a null, that is, a condition in which no current flows through the balance meter 102, the indicator needle 103 will be in the center indicating a zero or balanced reading.

In order to calibrate meter 102 for a definite unbalance to the left or to the right, one motor is run at a time. If the left motor 42 is run and the brakes of the vehicle are applied, only coil 80 will be the source of current to the meter 102; then the circuit network including variable resistors 116 and 118 will be unbalanced and the needle indicator 103 of meter 102 will be deflected to the left. The meter scale indicates a possible range of acceptance for unbalance. With a known braking force applied as indicated by the braking force meter 92 with only the one motor running, variable resistor 114 is adjusted to calibrate balance meter 102 to a preselected point on its scale. To check the other motor and the opposite or right hand indication, the other motor is run independently and the same braking force applied. The indication on meter 102 should then be the same but in the opposite direction from zero. The balance meter 102 is a comparative device and may be arranged having a scale from 0–10 on each side of the zero point at the middle of the scale.

In one device, for example, the scale has been designed so that 0–2 on each side of zero is a green area and 2–10 on each side of zero is a red area. The sensitivity of the meter has been designed so that a 70 lb. differential between the braking forces of two wheels being tested will just throw the needle 103 into the red indicating a non-acceptable unbalance between the braking forces of the two wheels being tested. When either the front wheels or rear wheels of a vehicle are being tested, if the right wheel has a higher braking force the needle 103 will move to the right; if the left wheel has a higher braking force the needle will move to the left.

In using this apparatus the brake test is usually performed first, the front wheels being the first to be tested. The vehicle is then driven further onto the test unit to brake test the rear wheels. When that is completed the vehicle may then be driven further to position the rear wheels on the rolls 28, 30, 32 and 34.

In performing the brake test on the front wheels, the latter are positioned on rolls 32, 36 and 34, 38 and the motors 42 and 44 independently drive the rolls 36 and 38. The operator energizes the brakes with the foot pedal. This resistance to turning is transmitted to the driven rolls 36 and 38 putting an increased load on the motors 42 and 44. In order to keep turning at a pretermined speed the motors then require more current and this greater amount of current causes a larger current flow in the induction coils 78 and 82. This increase in current is conveniently measured by the circuitry explained above and is translated into a reading on the braking force meter 92 of total braking force in lbs. at the tire treads.

At the same time that total braking force is being measured, a measurement of brake unbalance between the two wheels being tested can be read on the brake balance meter 103.

When the brake tests have been completed the air operated jack platforms 60 and 62 may be actuated to lift the front vehicle wheels so that the car may be moved forwardly to conduct brake tests on the rear wheels. When the platforms 60 and 62 are moved upwardly brake means 64 associated with the platforms are also moved upwardly and come into friction contact with the rolls 32, 34, 36 and 38, thus preventing the latter rolls from turning while the vehicle is proceeding to a new position on the testing device.

Once the brake tests on both the front and rear wheels have been completed, the vehicle is again moved forwardly so that the rear driving wheels of the vehicle are positioned on rolls 28, 30, 32 and 34, to undergo engine analysis tests and odometer—speedometer tests if these are desired.

While I have shown and described what I regard to be the preferred embodiment of my improved testing apparatus, it will be appreciated that various changes and rearrangements may be made therein without departing from the scope of the invention.

I claim:
1. In a vehicle testing device the combination comprising: first, second and third pairs of rolls, said first and second pair of rolls being adapted to support a pair of vehicle wheels thereon and to be driven by the vehicle wheels; means connected to said first pair of rolls for absorbing the force applied thereto; means for measuring the force absorbed by the means associated with said first pair of rolls; said second and third pair of rolls being adapted to support a pair of vehicle wheels and to drive the vehicle wheels; an electric motor for driving each roll of said third pair of rolls; current supply lines for each of said motors; inductor means associated respectively with the current supply lines for both of said motors; electric circuit means coupled to said inductor means including means for adding and means for subtracting one from the other the currents induced in inductor means associated with both said motors; a first meter connected with said adding means and calibrated in pounds for indicating total braking force; and a second meter connected with said subtracting means and having a center zero for indicating an exact balance of the induced currents and calibrated to both sides of zero for acceptable and unacceptable degrees of imbalance.

2. In a vehicle brake testing device the combination comprising: a pair of roll means for supporting a pair of vehicle wheels whose brakes are to be tested; means for driving each roll means independently of the other comprising individual electric motors drivingly connected to each of said roll means; current supply lines connected to each of said motors and adapted to be connected to a source of electrical power; a first pair of inductors inductively associated with a current supply line to one motor, a second pair of inductors inductively associated with a current supply line to the other motor, total force indicating means; circuit means coupling one each of the two pairs of inductors to said indicating means for adding the currents induced in said inductors by both of said motors; force comparing indicating means; and circuit means coupling the other two inductors to said force comparing indicating means for subtracting one from the other the currents induced in said inductors by each of said motors.

3. In a vehicle brake testing device as set forth in claim 2, each of said inductors comprising a torroidal induction coil strung on the respective current supply line.

4. In a vehicle brake testing device as set forth in claim 2, said circuit means for addition of the currents including rectifier means and variable resistor means for calibrating the total force indicating means, said circuit means for subtraction of the currents including a bridge circuit having means for rectification of each of the two currents and variable resistor means for balancing the bridge and calibrating said force comparing indicating means.

References Cited
UNITED STATES PATENTS

| | | | |
|---|---|---|---|
| 1,838,414 | 12/1931 | Langbein | 73—126 |
| 2,436,636 | 2/1948 | D'Entremont | 336—229 |
| 2,601,780 | 7/1952 | Baecher | 73—136 |
| 3,286,517 | 11/1966 | Ostrander | 73—116 |

FOREIGN PATENTS

| | | |
|---|---|---|
| 1,338,771 | 8/1963 | France. |

RICHARD C. QUEISSER, *Primary Examiner.*

JAMES J. GILL, *Examiner.*

J. W. MYRACLE, *Assistant Examiner.*